United States Patent [19]
Buck et al.

[11] Patent Number: 5,750,930
[45] Date of Patent: May 12, 1998

[54] ELECTRICAL CABLE FOR USE IN A MEDICAL SURGERY ENVIRONMENT

[75] Inventors: Arthur Glen Buck, Sherwood; Doris Arlene Beck, Beaverton; Sokha Chy, Tualtin, all of Oreg.

[73] Assignee: The Whitaker Corporation, Wilmington, Del.

[21] Appl. No.: 926,912

[22] Filed: Sep. 10, 1997

Related U.S. Application Data

[63] Continuation of Ser. No. 701,366, Aug. 22, 1996, abandoned, which is a continuation of Ser. No. 362,396, Dec. 22, 1994, abandoned.

[51] Int. Cl.$^6$ .................... H01B 7/04; H01B 7/18
[52] U.S. Cl. ............ 174/102 R; 174/103; 174/109
[58] Field of Search ................ 174/102 R, 103, 174/105 R, 106 R, 107, 109, 113 R, 120 R, 36

[56] References Cited

U.S. PATENT DOCUMENTS

| | | |
|---|---|---|
| 369,372 | 9/1887 | Turner . |
| 1,698,704 | 1/1929 | Middleton et al. . |
| 1,993,424 | 3/1935 | Weber ............... 173/267 X |
| 2,047,152 | 7/1936 | Mitchell .............. 173/81 X |
| 2,090,510 | 8/1937 | Bower ................ 173/264 X |
| 2,446,387 | 8/1948 | Peterson ................ 174/105 |
| 2,623,093 | 12/1952 | Smith ...................... 174/106 |
| 3,322,889 | 5/1967 | Bird et al. ............. 174/113 X |
| 3,351,706 | 11/1967 | Gnerre et al. ............ 174/105 |
| 3,594,491 | 7/1971 | Zeidlhack ............. 174/36 X |
| 3,832,481 | 8/1974 | Boyd et al. ........... 174/102 R |
| 3,885,085 | 5/1975 | Bahder et al. ............ 174/36 |
| 3,917,900 | 11/1975 | Arnaudin, Jr. ............ 174/107 |
| 4,151,365 | 4/1979 | Tijunelis et al. .......... 174/103 |
| 4,284,841 | 8/1981 | Hacker ................... 174/107 |
| 4,347,487 | 8/1982 | Martin .................... 331/1 X |
| 4,644,098 | 2/1987 | Norris et al. ............. 174/115 |
| 4,647,720 | 3/1987 | Vokey .................... 174/107 |
| 4,701,575 | 10/1987 | Gupta et al. ............. 174/107 |
| 4,707,569 | 11/1987 | Yoshimura et al. ....... 174/116 |
| 4,719,319 | 1/1988 | Tighe, Jr. ................ 174/103 |
| 4,761,519 | 8/1988 | Olson et al. ............. 174/107 |
| 4,761,811 | 8/1988 | Zetena, Jr. .............. 379/397 |
| 4,767,894 | 8/1988 | Schombourg ......... 174/106 SC |
| 4,815,207 | 3/1989 | Schwartzman ......... 29/828 X |
| 4,896,848 | 1/1990 | Hasegawa et al. ......... 252/609 |
| 4,963,695 | 10/1990 | Marciano-Agostinelli et al. . 174/23 C |
| 5,006,670 | 4/1991 | Plant ............... 174/106 SC X |
| 5,113,040 | 5/1992 | Hose et al. .............. 174/116 |
| 5,298,682 | 3/1994 | Salz ................... 174/120 R |
| 5,303,630 | 4/1994 | Lawrence ................. 87/9 |
| 5,463,188 | 10/1995 | Nohmi et al. ........ 174/108 X |

FOREIGN PATENT DOCUMENTS

| | | |
|---|---|---|
| 0 267 974 | 8/1988 | European Pat. Off. ......... 174/107 |
| 2 254 862 | 7/1975 | France . |
| 3 220 392 | 12/1983 | Germany . |
| 41-67716 | 7/1996 | Japan . |
| 1 480 078 | 7/1977 | United Kingdom . |

*Primary Examiner*—Kristine L. Kincaid
*Assistant Examiner*—Chau N. Nguyen
*Attorney, Agent, or Firm*—Gerald K. Kita

[57] ABSTRACT

An electrical cable with, multiple conductors, a dense braid encircling the conductors, a sealant sheath encircling the dense braid, an open braid encircling the sealant sheath, and a sealant layer covering the open braid and entering interstices in the open braid to bond to the sealant sheath.

5 Claims, 2 Drawing Sheets

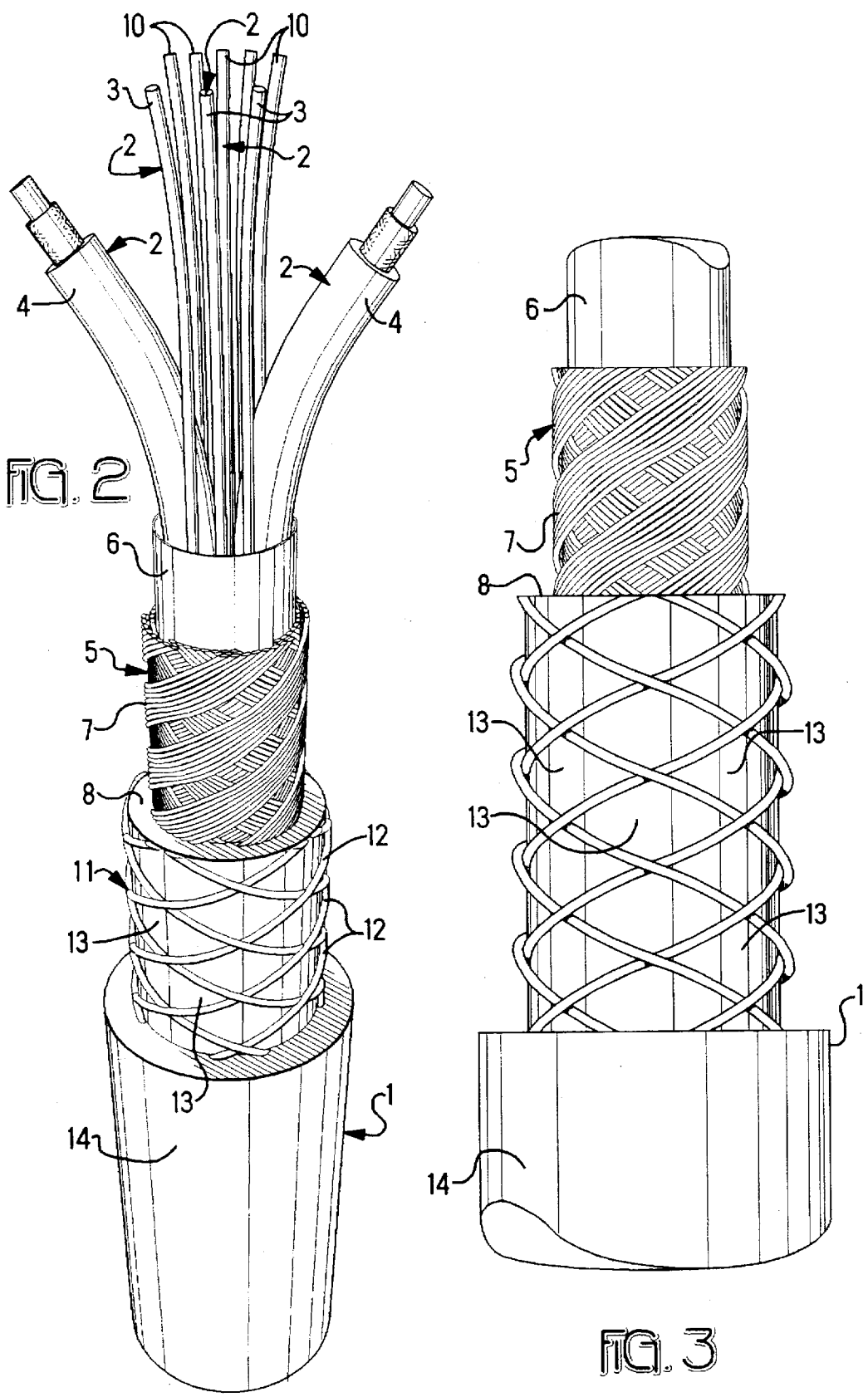

ELECTRICAL CABLE FOR USE IN A MEDICAL SURGERY ENVIRONMENT

This application is a Continuation of application Ser. No. 08/701,366 filed Aug. 22, 1996, now abandoned, in turn, a Continuation Application under 37 CFR 1.62 of application Ser. No. 08/362,396 filed Dec. 22, 1994, now abandoned.

FIELD OF THE INVENTION

The invention relates to an electrical cable, and more particularly to an electrical cable for use in a medical surgery environment.

BACKGROUND OF THE INVENTION

According to U.S. Pat. No. 4,761,519, an electrical cable is disclosed for linking an electronic medical instrument and a patient monitoring transducer. The transducer is applied to the body of a human patient to monitor human vital functions. A stiff and inflexible cable would apply a bias force on the transducer, which would resist movement of the transducer, and which would cause discomfort to the patient. An exterior of the cable must be smooth to avoid abrasion and other discomfort to the patient.

An electrical cable used in a medical surgery environment must resist contamination by blood-borne viruses and other infectious contaminants. The cable core, meaning component parts of the cable in the interior of the cable, must be sealed against incursions of such infectious contaminants, as well as other, noninfectious contaminants. Accordingly, such a cable is constructed with a sealant sheath that covers the cable core. The sealant sheath also is flexible, limp and capable of sterilization. A concern exists that such a sealant sheath is susceptible to being damaged by contact with sharp surgical tools and by contact with other surgical apparatus. Thus, it is desirable to provide armor protection for the sealant sheath. Armor protection is to be provided for a sealant sheath on such an electrical cable without significantly reducing flexibility of the cable, and without altering the exterior of the cable to cause discomfort to a patient.

SUMMARY OF THE INVENTION

An advantage of the invention resides in an armor protected and sealed electrical cable with enhanced flexibility and limpness for use in a medical surgery environment.

Another advantage of the invention resides in an electrical cable constructed with a sealant sheath protected from fracture by a limp and flexible armor.

Another advantage of the invention resides in an electrical cable constructed with a sealant sheath that isolates an interior of the cable from contaminates, together with armor that protects the sealant sheath from being damaged by contact with sharp surgical tools and other surgical apparatus.

A feature of the invention resides in an armor for protecting a sealant sheath on a sealed electrical cable, and the armor permitting a sealant coating that is applied over the armor to bond to the sealant sheath under the armor.

According to an embodiment of the invention, armor over a sealant sheath on an electrical cable comprises multiple wire strands, also known as ends, that are braided together with interstices in between the strands. An exterior sealant layer covers the armor and enters the interstices to bond to the sealant sheath.

Embodiments of the invention will now be described by way of example with reference to the accompanying drawings, according to which;

BRIEF DESCRIPTION OF THE DRAWINGS

FIG. 2 is a plan view of a portion of another electrical cable comprising, in part, a sealant sheath and an open braid;

FIG. 3 is a view of a portion of an alternative construction of the cable as shown in FIGS. 1 and 2; and FIG. 4 is a view of a sealant sheath and an armor with an open braid.

DESCRIPTION OF PREFERRED EMBODIMENTS

Figure 1:
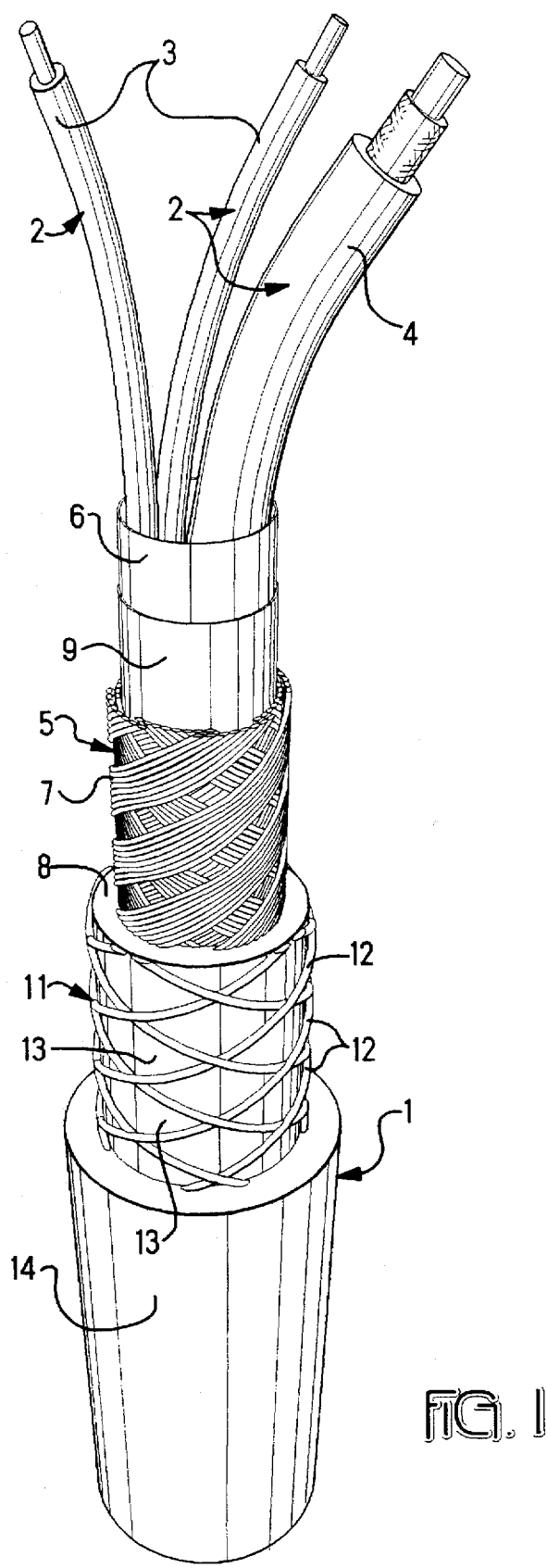
FIG. 1 is a plan view of a portion of an electrical cable comprising, in part, a sealant sheath and an open braid.

With reference to FIGS. 1 and 2, an electrical cable 1 for use in a medical surgery environment comprises one or more continuous electrical conductors 2, for example, one or more insulated wires 3 or one or more coaxial cables 4, or both insulated wires 3 and coaxial cables 4, of fine wire gauge, for example, 32 to 42 AWG. The conductors 2 comprise a core of the cable. The core of the cable further comprises, a continuous hollow sheath 6 of polytetrafluoroethylene that encircles the conductors 2. The hollow sheath 6 can be eliminated from the construction of the cable 1. The core of the cable further comprises, a continuous conductive electrical shield 5. The shield 5 encircles and covers the conductors 2, and covers the hollow sheath 6 if present. The electrical shield 5 is constructed of a dense braid of metal wire strands 7. The dense braid assures complete coverage over the conductors 2 that require the electrical shield 5 for protection from undesired RF and EMI electrical energy.

To seal the core from contaminants, a hollow sealant sheath 8 encircles and covers the shield. The sealant sheath is continuous, nonporous, and is fabricated of a flexible and limp material, for example, silicone known as GE 63A TUFEL, available from the General Electric Company, having a typical durometer of 63. According to FIG. 1, the core of the cable further comprises, a moisture barrier sheath 9 fabricated, for example, of ETFE polymer encircles the hollow sheath 6, and is interposed between the hollow sheath 6 and the electrical shield 5 of dense braid. The moisture barrier sheath is not present in the cable 1 shown in FIG. 2.

With reference to FIG. 3, an alternative construction of the cables 1 described in either FIG. 1 or FIG. 2, wherein the core of the cable 1 further comprises multiple filaments 10 of Kevlar that are bunched with the conductors 2 to provide the core of the cable 1 with a cross section of approximate cylindrical shape.

Silicone has high elasticity and is capable of being elongated with an elastic recovery to shape. Silicone is a surgical material and has low tear strength and is easily cut with a surgical instrument. A concern exists that such a sealant sheath 8 is susceptible to being damaged by contact with a sharp surgical tool and by contact with other surgical apparatus. Thus, it is desirable to provide armor protection for the sealant sheath 8. The cable 1 must be flexible and limp, and armored against cutting and penetration of contaminants, and have bonded together layers of jacketing material with the armor. The armor protection is to be provided for a sealant sheath 14 on such an electrical cable 1 without significantly reducing flexibility of the cable 1, and without altering the exterior of the cable 1 to cause discomfort to a patient.

According to a feature of the invention, an armor 11 comprises a continuous open braid of metal wire strands 12, also known as ends. The metal strands 12 are braided together in an open braid, meaning that at least fifty per cent of the area of the armor 11 is comprised of interstices 13 through the armor 11. The sealant sheath 8 need not be covered with a dense braid of metal wire, since an open braid provides a grid of wire strands 12 that will resist being penetrated by a sharp surgical tool and by other surgical apparatus. The open braid provides a flexible and limp armor 11 for protecting the sealant sheath 8 on the cable 1. Hard drawn stainless steel wires is preferred.

The open braid provides a further advantage, wherein the interstices 13 receive therein an exterior sealant coating that bonds to the sealant sheath 8. The exterior sealant coating 14 covers the armor and enters the interstices 13 and bonds to the sealant sheath 8. For example, both the sealant sheath 8 and the exterior sealant coating 14 can be fabricated of a silicone material, for example, GE 63A TUFEL, available from the General Electric Company, having a typical durometer of 63. Such material is cured, by the application of heat at a specified temperature and time duration, according to a process that is recommended by the manufacturer. The sealant sheath 8 on the cable 1 described with reference to FIG. 2 is partially cured by interrupting the process before completion of the curing process. The exterior sealant coating 14 is applied to the cable 1, and is subsequently cured completely, according to the process recommended by the manufacturer. The partially cured sealant sheath 8 becomes fully cured, together with the exterior sealant coating 14. The sealant sheath 8 and the exterior sealant coating 14 bond by fusion during the curing process.

The sealant sheath 8, fabricated of silicone for example, is partially cured, for example, 50% to 70% cured, and upon being fully cured, is converted from a putty-like consistency to a more solidified consistency. The exterior sealant coating 14 and the armor 11 comprise a unit of construction wherein they are immobile with respect to each other. The sealant coating 14 in the interstices 13 is interlocked with the armor of open braid construction, and is interlocked with the sealant sheath 8. The sealant coating 14 is capable of stretching resiliently and returning to its original shape. The open braid construction allows considerable stretching of the sealant coating 14 and the sealant sheath, since the coverage of the braid is 50% or less. The exterior sealant coating 14 and the sealant sheath 8 are described as being fabricated of the same material. However, other materials can be selected that will bond together, whether the same or different materials are selected, such materials having physical and chemical properties that permit the materials to bond to each other. The materials are required to bond together without melting the sealant sheath.

An electrical cable 1 for use in a medical surgery environment is to be sterilized, for example, in an autoclave environment, wherein the cable 1 is subjected to steam under pressure at 150 degrees Celsius for a time duration necessary for disinfection. Chemical disinfectants may be present in an autoclave environment. The interior of the cable 1 must be sealed to resist incursions of autoclave moisture and chemical contaminants from the core of the cable 1.

Accordingly, another aspect of the invention resides in an electrical cable 1 constructed with materials of enhanced flexibility and limpness that can withstand an autoclave environment. The materials for fabricating the sealant sheath 8 and the exterior sealant coating 14 resist steam under pressure at an elevated temperature of 150 degrees Celsius, for example, when sterilized in an autoclave environment. Such an elevated temperature degrades polymer cable materials, for example, by leaching plasticizers. The materials also take a set, meaning that their shape becomes permanently deformed. The armor on the cable 1 isolates the sealant sheath 8 from cuts in the cable 1 that would allow fluids of an autoclave environment to leak into interior of the cable 1 and cause damage to the materials in the core of the cable 1.

The cable 1 is constructed according to the following examples:

EXAMPLE I

A core of the cable 1 is constructed of conductors comprising, 2 34/32 gauge insulated wires 3 and one single coaxial cable 4. Insulation on the conductors 2 is capable of withstanding 150 degrees Celsius. Kevlar filaments 10 provide space fillers that will compress slightly to assume a cylindrical shape in the cross section of the core. The filaments 10 and the conductors 2 are bunched together in parallel to form a cylindrical bundle. Unsintered PTFE tape is helically wrapped over the conductors to provide a sheath 6 having an OD (over diameter) of 65thousandths of an inch. The sheath 8 is pressure extruded over with silicone to an OD of 110 thousandths of an inch. The silicone is cured to seventy per cent cured, followed by applying an armor of open braid of 304 stainless steel wires 12 having 30% coverage and a 60 degree braid angle with 10 pics per inch. Eight wire ends comprise the open braid of 4×4 ends per carrier. Standard braid coverage formulas, known in the industry, are followed to achieve 50% or less coverage of the sealant sheath 8 by the open braid. The open braid is partially imbedded in the partially cured, sealant sheath 8, and provides an OD of 115 thousandths of an inch. A pressure extrusion of an exterior sealant coating 14 of silicone covers the open braid, and is bonded to the sealant sheath 8 within interstices in the open braid. Curing at elevated temperatures will cure not only the exterior sealant 14 layer, but also will completely cure the partially cured, sealant sheath 8. The open braid becomes imbedded in the silicone material of the sheath 8 and the exterior sealant 14 layer. During curing, the exterior sealant 14 coating and the sealant sheath 2 bond together by fusion.

EXAMPLE 2

A finished cable 1 of 150 thousandths of an inch OD is constructed with equal thicknesses of polymer on both sides of a stainless steel braid. The braid angle of the braid pics is increased from 60 degrees braid angle to promote flexibility.

An advantage of the invention resides in an electrical cable constructed with a flexible and limp armor for protecting a sealant sheath on the cable.

Another advantage of the invention resides in an electrical cable constructed with an armor of open braid construction providing interstices in the armor within which an exterior sealant layer bonds to a sealant sheath that is protected from damage by the open braid.

Another advantage of the invention resides in an electrical cable for use in a surgery environment, according to which, a sealant sheath of the cable is capable of sterilization, an armor is constructed of braided metal strands over the sealant sheath, at least fifty per cent of the area of the armor is comprised of interstices through the armor, and an outer sealant coating covers the armor and enters the interstices to bond to the sealant sheath.

Another advantage of the invention resides in an electrical cable constructed with a flexible and limp armor for protecting a sealant sheath on the cable, interstices in the armor, and an exterior sealant coating on the armor and entering the interstices to bond to the sealant sheath.

Other embodiments and modifications are intended to be covered by the spirit and scope of the appended claims.

We claim:

1. An electrical cable comprising: multiple elongated electrical conductors being linked between a patient monitoring transducer and a medical instrument, said conductors being in a core of the cable, a hollow conducting electrical shield encircling the conductors, a flexible and limp sealant sheath encircling the shield and sealing the core against infectious contaminants, a flexible and limp armor enclosing the sheath in the form of an open braid of wire strands, and a flexible and limp sealant coating covering the armor and entering interstices between the wire strands to bond to the sealant sheath, the armor isolating the sealant sheath from a cut in the cable caused by a sharp surgical tool so that the sealant sheath remains capable of sterilization in an autoclave, and the cable having flexibility and limpness and being linked between said patient monitoring transducer and said medical instrument.

2. An electrical cable as recited in claim 1 wherein, the sealant sheath is a flexible and limp silicone material, the sealant coating covering the armor is a flexible and limp silicone material, the sealant sheath being partially cured when initially covered by the sealant coating, and the sealant sheath and the sealant coating are fully cured together, so as to fuse to each other.

3. An electrical cable as recited in claim 1 wherein, the sealant sheath is a flexible and limp curable material, the sealant coating covering the armor is a flexible and limp curable material, the sealant sheath being partially cured when initially covered by the sealant coating, and the sealant sheath and the sealant coating are fully cured together, so as to fuse to each other.

4. An electrical cable as recited in claim 1 wherein, a helically wrapped tape of polymer material between the shield and the electrical conductors forms a hollow sheath that encircles the electrical conductors.

5. An electrical cable as recited in claim 1 wherein, the shield is a braid of wire strands, and a helically wrapped tape of polymer material between the shield and the electrical conductors forms a hollow sheath that encircles the electrical conductors.

* * * * *